United States Patent
Klintworth et al.

[11] Patent Number: 5,699,917
[45] Date of Patent: Dec. 23, 1997

[54] METHOD AND APPARATUS FOR SEPARATING CROPS AND IMPURITIES

[76] Inventors: Klaus Klintworth; Johann Klintworth, both of Finkenstrasse 39, 21624 Buxtehude, Germany

[21] Appl. No.: 810,904

[22] Filed: Mar. 5, 1997

Related U.S. Application Data

[63] Continuation of Ser. No. 518,008, Aug. 22, 1995, abandoned.

[30] Foreign Application Priority Data

Aug. 23, 1994 [DE] Germany ............ 44 29 868.4

[51] Int. Cl.⁶ ........................................... B03B 5/60
[52] U.S. Cl. ........................................... 209/18; 209/173
[58] Field of Search ..................... 209/18, 155, 158, 209/159, 172, 172.5, 173, 208; 415/206

[56] References Cited

U.S. PATENT DOCUMENTS

| | | | |
|---|---|---|---|
| 2,698,087 | 12/1954 | Call et al. | 209/173 X |
| 2,708,517 | 5/1955 | Evans | 209/158 |
| 3,547,554 | 12/1970 | Willette | 415/206 X |
| 3,722,035 | 3/1973 | Hanks | 209/173 X |
| 3,773,432 | 11/1973 | Chow et al. | 415/206 |
| 4,259,179 | 3/1981 | Marvin | 209/18 |
| 4,830,188 | 5/1989 | Hannigan et al. | 209/173 X |
| 4,858,769 | 8/1989 | DeVries | 209/173 X |

FOREIGN PATENT DOCUMENTS

| | | |
|---|---|---|
| 0 482 316 | 8/1991 | European Pat. Off. . |
| 2671988 | 7/1992 | France ............ 209/173 |
| 28 45 383 | 4/1980 | Germany . |
| 35 05 043 | 8/1986 | Germany . |
| 38 22 144 | 1/1990 | Germany . |
| 856 909 | 12/1960 | United Kingdom . |

OTHER PUBLICATIONS

Official communication issued by German Patent Office for DE P 44 29 868.4 (dated Nov. 7, 1994).

*Primary Examiner*—Tuan Nguyen
*Attorney, Agent, or Firm*—Fish & Richardson P.C.

[57] ABSTRACT

A method and an apparatus for separating crops and impurities are described, which exploit the different specific gravities of the materials to be separated. The separation is performed with the help of a liquid exploiting the different lifting forces, since the materials to be separated differ clearly in specific gravity. If the specific gravity of the separating liquid does not suffice to effect the necessary lift for the crop, one produces a flow acting against the sinking direction of the impurities to increase the lifting force for the crop and cause it to collect by floating on the surface of the separating liquid. Water is preferably utilized as a separating liquid, and the flow is produced with the help of a pump wheel or bucket wheel. The method has proven especially useful for separating potatoes and stones.

9 Claims, 1 Drawing Sheet

METHOD AND APPARATUS FOR SEPARATING CROPS AND IMPURITIES

This is a continuation of application Ser. No. 08/518,008, filed Aug. 22, 1995, now abandoned.

BACKGROUND OF THE INVENTION

This invention relates to a method and an apparatus for separating crops and impurities, exploiting the different specific gravities of the materials to be separated.

Pick-up loaders for the various types of crops are in agricultural use today, which make it possible to separate the crop from the other parts of the plant satisfactorily. However, one has not yet succeeded in reliably freeing crops, for example tomatoes, beets, potatoes, onions, from foreign impurities, such as clods of earth and stones, with the desired reliability in practical harvesting.

There has, of course, been no lack of attempts to construct harvesters for effecting such separation of crops and impurities, with various mechanical solutions, for example. However, no separating device of this type has been able to enter into industrial practice up to now, in particular, since none has managed to guarantee a high separation rate up to almost 100%. The main difficulty proves to be to master the different sizes and shapes of the individual crops and their impurities, in particular, the stones.

Mechanical separating devices which are utilized in agriculture include machines with rubber finger transport bands in conjunction with brush-off devices. The crop precleaned from plant residues and earth passes onto a transport band provided with rubber fingers into which the heavier stones sink deeper, and the crop, for example potatoes, mainly stay on the rubber fingers from which they are then brushed. A further development of this method is described, for example, in German laid-open print 35 05 043, wherein the potatoes and stones are thrown off the rubber finger band with a rotating vertically adjustable and speed-variable brush cylinder, and the stones of greater specific gravity, also due to their greater sinking depth in the rubber fingers, thereby cover a shorter throw-off distance than the potatoes of lesser specific gravity, and the actual separation takes place through a corresponding separating edge between the crop and its impurities flying different distances.

Further German laid-open print 38 22 144 describes a device for isolating the crop from soil impurities. This invention uses the centrifugal force which is greater for the impurities than for the crop since the impurities have a higher density. The impurities, including damaged crop, are transported off via conveyer bands disposed in ascending fashion.

Known mechanical systems, for example, for separating potatoes from stones, only reach an average sorting success of approx. 50% of the stones. Therefore, modern potato harvesters include one or more sorting bands on which the impurities still present after mechanical separation are sorted out by hand. The European patent application with publication number 04 82 316 A1 describes such a modern potato harvester, which is characterized in that the separating band which extends perpendicular to the leaf chain consists of two separating portions running in opposite directions and conveying from the middle to the side, the separating portions being designed to throw off the impurities on different sides of the machine, and to transfer the potatoes to conveyer and sorting bands, following in each case and extending from the back to the front.

Along with these mechanical separating devices, electronic apparatus are also known, which analyze each individual piece of the crop or impurity, and subsequently sort them mechanically. To achieve sufficient throughputs with this relatively complicated method, one works with a multiple-channel system, wherein each channel, of course, has its own analyzer. This high effort increases the costs accordingly, and no economy can yet be shown, at present, in comparison with mechanical separation in combination with resorting by hand.

Furthermore, a separation of crop and stones is also conceivable on the principle of classification by air. However, successful classification by air presupposes approximately equal outside dimensions of the material to be sorted due to the physical circumstances. A relatively narrow pregrading into approximately ten levels again requires an elaborate multiple-channel technology for the actual classification, and this involves high costs, which ultimately jeopardize the economy and possible marketing.

SUMMARY OF THE INVENTION

The invention is based on the problem, starting out from the described prior art, of taking a fully untrodden path in separating crops from their impurities, and providing a reliable method, with a virtually 100% sorting result, which is furthermore applicable economically and cost-effectively.

The invention solves this problem by performing separation with the help of a liquid, exploiting the different lifting forces of these materials of different specific gravities to be separated.

The invention is based on the finding that crops in the harvesting state have a specific gravity of approx. 1.2 $kg/dm^3$ and their impurities, mainly stones, have a specific gravity of at least 2.0 $kg/dm^3$. The inventive method deliberately utilizes this density difference in separating the crops from their impurities, and performs the actual sorting with a success rate of almost 100% in a neutral medium, namely a liquid, exploiting the different lifting forces of these materials of different specific gravities to be separated.

According to the invention, this can be done very simply in a liquid whose specific gravity is between that of the crop, for example potatoes, and that of the impurities, for example stones. A reliable separating function would accordingly be given in a liquid having a specific gravity of approximately 1.6 $kg/dm^3$ This specific gravity is, on the one hand, clearly above the specific gravity of the crop, and, on the other hand, far enough below the specific gravity of the stones. The separating result is that the crops float on the surface of this liquid, while the impurities sink to the bottom of the tank.

An additional requirement for the liquid with the suitable specific gravity of approx. 1.6 $kg/dm^3$ is that it be safe for people and the crop. Exposure to the liquid must, furthermore, not impair the taste of the crop or its storability. Since up to now, liquids found with the suitable specific gravity include only liquids such as highly concentrated, water-containing solutions of sodium hydroxide, potash lye and brines of various salts, there is no suitable separating liquid to fulfill these prerequisites, according to present findings. It is within the scope of the invention, however, to use a corresponding, safe separating liquid with the desired specific gravity as soon as it is found for a crop.

In terms of the health demands, water is, of course, especially suitable as a separating liquid, since it behaves fully neutrally toward the crop, and it is also safe to human health in every respect. It has, surprising 14, turned out that if usual water, as is available everywhere and has a specific gravity of approximately 1 $kg/dm^3$, is set in motion, i.e. given a velocity of flow contrary to the sinking direction of the crop, it is readily possible to collect the crop floating on the liquid surface, on the one hand and have the impurities, in particular stones, sink to the bottom of the tank on the other hand.

A preferred embodiment of the inventive method accordingly consists in performing the separation of crop and impurities in a tank which contains water as a separating liquid, and subjecting the water to a flow preferably directed contrary to the sinking direction of the materials to be separated. The velocity of flow can be adjustable according to the invention, and it is adjusted so that the crop floats reliably on the water surface, while the impurities drop to the bottom of the tank. It has turned out to be favorable for separating potatoes and stones, for example, to introduce a velocity energy into the system which corresponds approximately to an additional lifting force of 0.3 to approx. 0.8 kg/dm$^3$, preferably approx. 0.5 to 0.7 kg/dm$^3$. Thus the crop in the separating liquid tank undergoes a lift, such that it is held in suspension close to the surface of the separating liquid or water, and transported from there out of the liquid tank with a suitable transport device, for example, conveyer band. The impurities, chiefly clods of earth and stones, sink to the bottom of the liquid tank and are transported from there out of the separating liquid tank by a one- or multi-stage conveying device. This can be, for example, a cross belt, which subsequently transfers the impurities to an elevator or similar conveying device, which lifts them out of the separating liquid tank.

According to the invention, the velocity of flow necessary for the additional lifting force of the crop in the water is produced by relatively simple suitable devices, for example, a bucket wheel or pump wheel. The velocity of flow of the water can also be regulated in this way with relatively simple means, for example, the speed of the bucket or pump wheel can be varied, or one can regulate the cross section of the outlet aperture of the water from the bucket or pump wheel housing into the water tank.

It is in accordance with the invention to keep constant the adjusted water velocity, which leads to reliable separation of crop and impurities. This can be the same velocity of water flow in all cases for the various crops, for example potatoes, onions, tomatoes, or it is readjusted from case to case at the beginning of the harvest, and then maintained for the further duration of harvesting.

According to the invention, the crop, after being transported out of the separating liquid/water tank with a suitable transport device, e.g. conveyer band, can be transferred to further transport devices, for example, liquid draining bands, to be finally deposited on the field to be dried by wind and sun.

The method according to the invention has proven useful for separating various crops, for example, potatoes, beets, carrots, onions, tomatoes, from their impurities, mainly clods of earth and stones. It is particularly suitable for separating potatoes and stones.

A preferred apparatus for applying the method for separating crops and impurities which utilizes the different specific gravities of the materials to be separated, comprises a suitable tank, which is coupled directly to a usual pick-up loader, which deposits the crop, including its impurities, on a feeding or charging apparatus on the upper edge of the separating liquid tank, on the side facing the pick-up loader, via a transport device, e.g. a conveyer band or grid roller band. From there, the mixture of crop and impurities passes into the deeper separating area of the liquid tank. Here, there is a flow directed upward from the tank bottom to the water surface, which contributes to the crop floating on the surface, or being held in suspension very close to the water surface, while the impurities, mainly clods of earth and stones, drop to the bottom of the tank. Since the bucket or pump wheel is arranged near the tank bottom, the flow is directed in the entire tank space, so that the crop floats close to the surface, toward a discharge apparatus, for example, a water-permeable conveyer band, and leaves the water tank at approximately the same speed as it is delivered by the pick-up loader, being subsequently conveyed via one or more draining conveyer bands into either a transport car or a silo, but preferably being deposited on the field to be dried by wind and sun.

The pumping device used for producing the desired water flow from the tank bottom to the water surface can be fundamentally any pumping device suitable for this water quality. However, one preferably uses bucket or pump wheels, due to their robustness in rough agricultural operation, and because they are, furthermore, cost-effective. The water supply can be introduced into the separating water tank from the pumping device directionally, via one or more openings or nozzles. This makes it possible to adjust the desired upward flow in the separating area of the liquid tank more exactly and reliably, and, simultaneously, to control the water recycling to the pumping device in the upper part of the tank so that it contributes to the discharge apparatus for crop transport.

The inventive apparatus in a preferred embodiment has a device for feeding the crop, including its impurities, into the separating liquid tank. This charging apparatus is mounted at the upper edge of the water tank, approximately diagonally opposite the water supply openings in the lower area of the part of the tank with the greatest water depth.

In the following the inventive method and the apparatus will be explained more closely with reference to examples and a representation.

DESCRIPTION OF PRESENTLY PREFERRED EMBODIMENT

Figure 1:
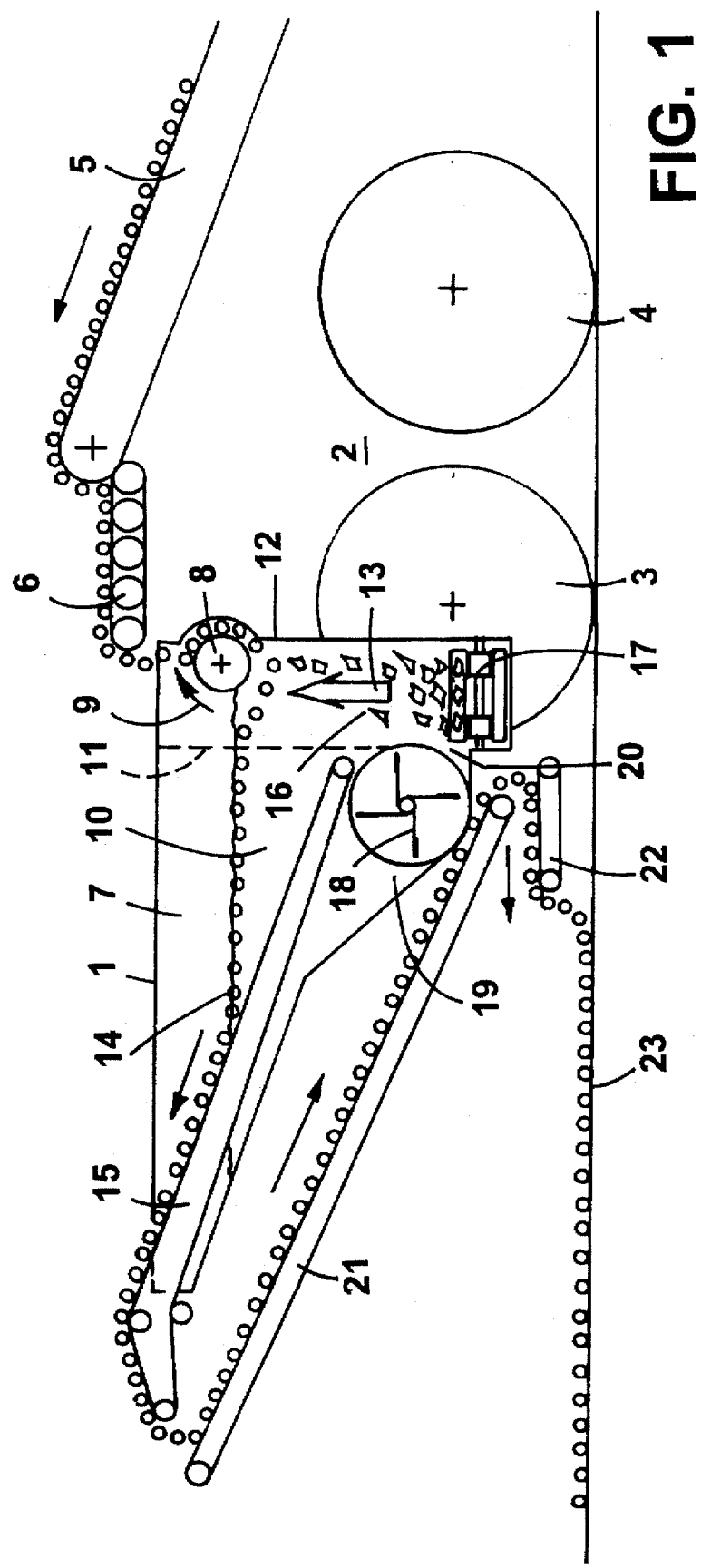
FIG. 1 shows a largely schematic representation of the longitudinal section through the apparatus for separating crops and impurities.

Referring to the figure separating apparatus 1 is connected by coupling points (not shown) with the pick-up loader, in this case, potato digger 2. The pick-up loader is drawn schematically, outlined mainly by two wheels 3 and 4. Via conveyer band 5 and following rollers 6, the potatoes, including their impurities, pass to the separating apparatus, and fall there, at the upper edge of water tank 7, onto charging apparatus 8, in this case, a metering roll rotating in the direction of arrow 9. The feeding apparatus deposits the mix of potatoes and impurities into separating liquid tank 7 with water bath 10, without any great additional speed.

In the deep part of the water bath, which is limited from the flat part of the tank by dot-dash auxiliary line 11, and from the potato digger by tank wall 12, an upwardly directed water flow is maintained, shown by arrow 13. Flow 13, in conjunction with the lifting force of the water, causes potatoes 14 to float to the water surface and toward removing conveyer band 15. Due to their higher specific gravity, stones 16 sink onto discharge apparatus 17, in this case, a cross belt, which transfers the impurities, in particular, stones and clods of earth, to an elevator-like discharge apparatus (not shown), which conveys this material out of the water tank.

Water flow 13 is produced by bucket wheel 18, which takes in water in area 19 and conducts it via nozzle-like opening 20 into the deeper part of the tank with the adjustable speed. The potatoes leave the water tank via removing conveyer band 15 and pass via draining band 21 to depositing apparatus 22, which deposits them on the field, in schematically indicated rows 23, to be dried by wind and sun.

According to the invention, the separating apparatus can be varied, within wide limits, constructionally, and in terms of its individual devices, such as feeding apparatus, transport and conveyer bands, and the pumping device, without departing from the scope of the invention. As long as one maintains the principle of separating crops and their impurities with the help of a liquid exploiting the different lifting forces of these materials of different specific gravities to be separated, one is within the scope of the present invention.

We claim:

1. A method for separating crops of a first specific gravity from impurities of a second, relatively greater specific gravity, the separation taking place in a liquid flow, characterized by the steps of:

providing a volume of liquid;

directing a separating liquid flow in an upward direction within the volume of liquid toward a liquid surface, depositing a random assemblage of crops and impurities to be separated directly into the liquid surface in a direction against the upward direction of the separating liquid flow, and adjusting the velocity of the separating liquid flow in manner to cause the impurities of said second, relatively greater specific gravity to drop through the liquid in the separating liquid flow in a direction contrary to the upward direction of the separating liquid flow within the volume of liquid and to cause the crop of said first specific gravity to be maintained, by the separating liquid flow, in a region at least close to the liquid surface.

2. The method of claim 1, wherein the crop is potatoes and the liquid is water, said method is characterized by the further step of:

in the separating liquid flow of water, separating the potatoes from impurities comprising stones and clods of earth.

3. The method of claim 1, wherein the crop is potatoes, said method characterized by the further steps of:

providing a liquid tank for containing said volume of liquid, providing first transport devices, and feeding the potatoes from the volume of liquid in the liquid tank via the first transport devices to a further transport device or a silo or deposit on the field.

4. The method of claim 3, wherein said method is characterized by the further step of:

providing said first transport devices comprising liquid draining bands.

5. The method of claim 2, wherein the crop is potatoes, said method characterized by the further steps of:

providing a liquid tank containing said volume of liquid, providing first transport devices, and feeding the potatoes from the volume of liquid in the liquid tank via the first transport devices to a further transport device or a silo or deposit on the field.

6. The method of claim 5, wherein said method is characterized by the further step of providing said first transport devices comprising liquid draining bands.

7. An apparatus for separating crops from impurities, the separation taking place in a separating liquid flow, said apparatus comprising:

a liquid tank for containing a volume of separating liquid, a pumping device disposed in communication with the volume of separating liquid for producing a separating flow of liquid directed upward within the volume of separating liquid toward a liquid surface, said apparatus being adapted to follow directly behind a pick-up loader and to receive an assemblage of the crops and the impurities passing to be separated into the liquid tank via a charging apparatus positioned in a manner to drop the assemblage of the crops and the impurities to be separated directly into the liquid surface in a direction contrary to the upward direction of the separating liquid flow, the apparatus further comprising:

means for adjusting the velocity of the separating liquid flow in a manner to cause the impurities of said second, relatively greater specific gravity to drop through the separating liquid in the separating liquid flow in a direction contrary to the upward direction of separating liquid flow within the volume of separating liquid and to cause the crop of said first specific gravity to be maintained, by the separating liquid flow, in a region at least close to the liquid surface, a removing conveyor band for conveying the crops out of the liquid tank from the region at least close to the liquid surface, and a discharge apparatus for conveying the impurities out of the liquid tank from a region spaced from the region at least close to the liquid surface.

8. The apparatus of claim 7, characterized in that the pumping device for the separating liquid consists of a bucket wheel or pump wheel.

9. The apparatus of claim 8, characterized in that said seperating liquid comprises water.

* * * * *